(12) United States Patent
Sunaba et al.

(10) Patent No.: US 12,415,531 B2
(45) Date of Patent: Sep. 16, 2025

(54) VEHICLE DISPLAY DEVICE, DISPLAY METHOD, AND STORAGE MEDIUM

(71) Applicant: TOYOTA JIDOSHA KABUSHIKI KAISHA, Toyota (JP)

(72) Inventors: Shogo Sunaba, Toyota (JP); Takahiro Hirota, Aichi-ken (JP); Yuting Zhang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 17/806,114

(22) Filed: Jun. 9, 2022

(65) Prior Publication Data

US 2022/0396285 A1 Dec. 15, 2022

(30) Foreign Application Priority Data

Jun. 10, 2021 (JP) ................. 2021-097507

(51) Int. Cl.
*B60W 50/14* (2020.01)
*B60K 35/22* (2024.01)
(Continued)

(52) U.S. Cl.
CPC ............ *B60W 50/14* (2013.01); *B60K 35/22* (2024.01); *B60K 35/234* (2024.01); *B60K 35/28* (2024.01);
(Continued)

(58) Field of Classification Search
CPC ........... B60W 50/14; B60W 30/18163; B60W 2050/146; G02B 27/0101; G02B 27/0112;
(Continued)

(56) References Cited

U.S. PATENT DOCUMENTS

2014/0371988 A1* 12/2014 Muramatsu ........ B62D 15/0295
701/41
2015/0073661 A1* 3/2015 Raisch ................ B62D 15/027
701/41
(Continued)

FOREIGN PATENT DOCUMENTS

JP 2017084112 A 5/2017
JP 2017091115 A 5/2017
(Continued)

OTHER PUBLICATIONS

Tommy Thompson, How Forza's Drivatar Actually Works, Jun. 1, 2021, gamedeveloper.com; pp. 1-20.*

*Primary Examiner* — Andrew R Dyer
(74) *Attorney, Agent, or Firm* — Dickinson Wright, PLLC

(57) ABSTRACT

A vehicle display device configured to display a predetermined image on a display region depicting a scene ahead of a vehicle, the vehicle display device including memory and a processor connected to the memory. The processor is configured to identify a traffic lane ahead of the vehicle, identify a position of the vehicle with respect to the traffic lane, set a planned position planned to be a lane change destination based on the identified position of the vehicle, and when the vehicle is to change lanes, display a direction image indicating a direction of progress of the vehicle on the display region, and alter a direction indicated by the direction image based on a relative positional relationship of the vehicle with respect to the planned position.

15 Claims, 9 Drawing Sheets

(51) Int. Cl.
- *B60K 35/234* (2024.01)
- *B60K 35/28* (2024.01)
- *B60W 30/18* (2012.01)
- *G02B 27/01* (2006.01)
- *G06T 11/00* (2006.01)
- *B60K 35/29* (2024.01)

(52) U.S. Cl.
CPC ... *B60W 30/18163* (2013.01); *G02B 27/0101* (2013.01); *G06T 11/001* (2013.01); *B60K 35/29* (2024.01); *B60K 2360/175* (2024.01); *B60W 2050/146* (2013.01); *G02B 2027/0112* (2013.01); *G02B 2027/014* (2013.01); *G02B 2027/0141* (2013.01)

(58) Field of Classification Search
CPC ............ G02B 27/014; G02B 27/0141; G02B 27/0165; G06T 11/001; G06T 11/00; B60K 35/00; B60K 35/23; B60K 35/28; B60K 35/22; B60K 2360/175; B60K 2360/166; B60K 2360/177; B60K 2360/16; B60R 1/00; B60R 1/22; B60R 16/02
USPC .......................................................... 701/26
See application file for complete search history.

(56) References Cited

U.S. PATENT DOCUMENTS

| | | | |
|---|---|---|---|
| 2015/0142251 A1* | 5/2015 | Aldereguia | G06V 20/582 701/28 |
| 2016/0129836 A1* | 5/2016 | Sugita | B60K 35/231 701/41 |
| 2016/0304126 A1 | 10/2016 | Yamaoka et al. | |
| 2018/0143431 A1* | 5/2018 | Matsuura | G02B 27/01 |
| 2019/0011712 A1* | 1/2019 | Nagano | G09G 3/02 |
| 2019/0283778 A1* | 9/2019 | Dias | G02B 27/0179 |
| 2020/0191588 A1* | 6/2020 | Park | G08G 1/096811 |
| 2020/0309555 A1 | 10/2020 | Kumon | |
| 2021/0016793 A1* | 1/2021 | Yamaguchi | G08G 1/096861 |
| 2021/0129858 A1* | 5/2021 | Omasta | B60W 40/09 |
| 2021/0146943 A1* | 5/2021 | Oniwa | B60R 21/00 |
| 2021/0157330 A1* | 5/2021 | Tran | G06V 20/588 |
| 2021/0341737 A1 | 11/2021 | Horihata et al. | |
| 2022/0055481 A1* | 2/2022 | Shimizu | B60K 35/00 |
| 2022/0212689 A1 | 7/2022 | Nakao et al. | |
| 2023/0046484 A1* | 2/2023 | Fang | B60K 35/00 |

FOREIGN PATENT DOCUMENTS

| | | |
|---|---|---|
| JP | 2017092678 A | 5/2017 |
| JP | 2020125033 A | 8/2020 |
| JP | 2020163931 A | 10/2020 |
| JP | 2021006805 A | 1/2021 |
| WO | 2019/189515 A1 | 10/2019 |
| WO | 2020/230613 A1 | 11/2020 |

\* cited by examiner

VEHICLE DISPLAY DEVICE, DISPLAY METHOD, AND STORAGE MEDIUM

CROSS-REFERENCE TO RELATED APPLICATION

This application is based on and claims priority under 35 USC 119 from Japanese Patent Application No. 2021-097507 filed on Jun. 10, 2021, the disclosure of which is incorporated

BACKGROUND

Technical Field

The present disclosure relates to a vehicle display device, a display method, and a storage medium.

Related Art

Japanese Patent Application Laid-Open (JP-A) No. 2017-91115 discloses a vehicle display device (head-up display device) that displays a direction of progress of a vehicle when the vehicle is to change lanes during travel by autonomous driving. In this vehicle display device, prior to performing a lane change planned in a travel plan, an arrow-shaped progress-direction mark indicating the direction of progress is projected and displayed on front windshield glass at a position corresponding to the current travel lane and to a lane that is a lane change destination.

However, if the direction of progress from the travel lane prior to the lane change to the lane change destination lane is merely indicated as in the technology disclosed in JP-A No. 2017-91115, the progress of the lane change cannot be conveyed in stages.

SUMMARY

In consideration of the above circumstances, an object of the present disclosure is to provide a vehicle display device, a display method, and a storage medium that are capable of conveying the progress of a lane change to an occupant in stages.

A vehicle display device according to a first aspect of the present disclosure is a vehicle display device configured to display a predetermined image at a display region depicting a scene ahead of a vehicle. The vehicle display device includes: a lane identification section configured to identify a traffic lane ahead of the vehicle; a vehicle position identification section configured to identify a current position of the vehicle with respect to the traffic lane; a planned position setting section configured to establish a planned position that is a planned lane change destination based on the current position of the vehicle; and a display implementation section configured to, when the vehicle is to change lanes, display a direction image indicating a direction of progress of the vehicle at the display region, and alter a direction indicated by the direction image based on a relative positional relationship of the vehicle with respect to the planned position.

In the first aspect, the vehicle display device displays the predetermined image at the display region depicting the scene ahead of the vehicle. The vehicle display device identifies the traffic lane ahead of the vehicle and the current position of the vehicle with respect to the traffic lane, and sets the planned position planned to be the lane change destination based on the position of the vehicle. Then, when the vehicle is to change lanes, the direction image indicating the direction of progress of the vehicle is displayed on the display region.

Note that the vehicle display device alters the direction indicated by the direction image based on the relative positional relationship of the vehicle with respect to the planned position. Chronologically altering the direction indicated by the direction image in this manner enables an occupant to perceive the process in which the vehicle is proceeding toward the planned position. The vehicle display device thereby enables the progress of the lane change to be conveyed in stages to the occupant.

A vehicle display device according to a second aspect of the present disclosure has the configuration of the first aspect, wherein the display implementation section is configured to display the direction image at the display region when the vehicle is to change lanes by autonomous driving.

In the second aspect, in cases in which the lane change is performed during autonomous driving, the occupant is able to perceive the process in which the vehicle is proceeding toward the planned position from the chronological alterations to the direction indicated by the direction image. The occupant is thereby able to ascertain that the vehicle is being controlled during the lane change by autonomous driving, thereby enabling any anxiety felt by the occupant to be alleviated.

A vehicle display device according to a third aspect of the present disclosure has the configuration of the first aspect or the second aspect, wherein the display implementation section is configured to alter the direction indicated by the direction image at a time at a start of the lane change, during the lane change, and at an end of the lane change.

In the third aspect, the occupant is able to perceive the progress from the start to the end of the lane change from the direction indicated by the direction image.

A vehicle display device according to a fourth aspect of the present disclosure has the configuration of any one of the first aspect to the third aspect, wherein the display implementation section is configured to continually alter the direction indicated by the direction image.

The fourth aspect enables a visual effect to be imparted to the occupant whereby the direction indicated by the direction image is altered in coordination with movement of the vehicle toward the planned position. This enables the occupant to intuitively perceive the progress of the lane change.

A vehicle display device according to a fifth aspect of the present disclosure has the configuration of any one of the first aspect to the fourth aspect, wherein the display implementation section is configured to alter a color of the direction image at least one of a time at a start of the lane change, during the lane change, or a time at an end of the lane change.

In the fifth aspect, altering the color of the direction image at predetermined stages during the lane change enables these predetermined stages during the lane change to be emphatically conveyed to the occupant. Thus, for example, emphatically conveying the start of the lane change enables the occupant to prepare for lateral direction movement of the vehicle in advance. Moreover, emphatically conveying that the lane change is in progress prompts the occupant to be cautious regarding the vehicle surroundings. Moreover, emphatically conveying the end of the lane change enables the occupant to feel more secure.

A vehicle display device according to a sixth aspect of the present disclosure has the configuration of any one of the first aspect to the fifth aspect, wherein the display implementation section is configured to emphatically display the direction indicated by the direction image based on a direction corresponding to a rotation angle of a steering wheel that is greater than an actual steering angle of the vehicle.

In the sixth aspect, the direction image indicates a direction corresponding to the rotation angle of the steering wheel that is larger than the actual steering angle (tire turning angle) of the vehicle. This enables the direction of progress of the vehicle to be emphatically displayed to the occupant. Moreover, the direction indicated by the direction image is indicated in coordination with rotation of the steering wheel. This enables the occupant to intuitively ascertain that the steering wheel is being operated during the lane change, and to perceive the progress of the lane change.

A vehicle display device according to a seventh aspect of the present disclosure has the configuration of any one of the first aspect to the sixth aspect, wherein the direction image includes plural images arranged in a row from a near side toward a far side of the display region. The plural images chronologically indicate the direction of progress of the vehicle in a sequence starting from an image at the near side of the display region.

In the seventh aspect, the direction image includes the plural images arranged in a row from the near side to the far side of the display region. These plural images chronologically indicate the direction of progress of the vehicle in a sequence from the image at the near side of the display region. Thus, the planned travel route of the vehicle is indicated by the direction image, and the planned travel route is chronologically altered by altering the direction indicated by the direction image. Viewing the manner of these chronological alterations to the planned travel route of the vehicle enables the occupant to perceive the progress of the lane change.

A vehicle display device according to an eighth aspect of the present disclosure has the configuration of any one of the first aspect to the seventh aspect, wherein the display region is configured by a projection surface that is provided at a vehicle front side of a driving seat and configured to be projected onto by a head-up display device. The display implementation section is configured to display the direction image indicating the direction of progress of the vehicle on the display region so as to be superimposed on a traffic lane in the scene ahead of the vehicle as viewed through the display region.

In the eighth aspect, the display region that depicts the scene ahead of the vehicle is configured by the projection surface that is provided at the vehicle front side of the driving seat and configured to be projected onto by the head-up display device. When a lane change is to be performed, the direction image indicating the direction of progress of the vehicle is displayed so as to be superimposed on the traffic lane that is visible through the display region. Thus, in the vehicle display device, the direction image is displayed as a fusion with the scene ahead as viewed from the driving seat, thereby enabling the occupant of the driving seat to perceive the lane change in stages without having to greatly shift their gaze.

A display method according to a ninth aspect of the present disclosure is a display method for displaying a predetermined image at a display region depicting a scene ahead of a vehicle. The display method includes identifying a traffic lane ahead of the vehicle, identifying a current position of the vehicle with respect to the traffic lane, establishing a planned position that is a planned lane change destination based on the current position of the vehicle, and when the vehicle is to change lanes, displaying a direction image indicating a direction of progress of the vehicle at the display region, and altering a direction indicated by the direction image based on a relative positional relationship of the vehicle with respect to the planned position.

As described above, the display method according to the ninth aspect enables the progress of the lane change to be conveyed to the occupant in stages.

A program according to a tenth aspect of the present disclosure is a program to display a predetermined image at a display region depicting a scene ahead of a vehicle by causing a computer to execute processing including identifying a traffic lane ahead of the vehicle, identifying a current position of the vehicle with respect to the traffic lane, establishing a planned position that is a planned lane change destination based on the current position of the vehicle, and when the vehicle is to change lanes, displaying a direction image indicating a direction of progress of the vehicle at the display region, and altering a direction indicated by the direction image based on a relative positional relationship of the vehicle with respect to the planned position.

As described above, the program according to the tenth aspect enables the progress of the lane change to be conveyed to the occupant in stages.

The present disclosure enables the progress of the lane change to be conveyed to the occupant in stages.

BRIEF DESCRIPTION OF THE DRAWINGS

Exemplary embodiments of the present invention will be described in detail based on the following figures, wherein.

DETAILED DESCRIPTION

Figure 1:
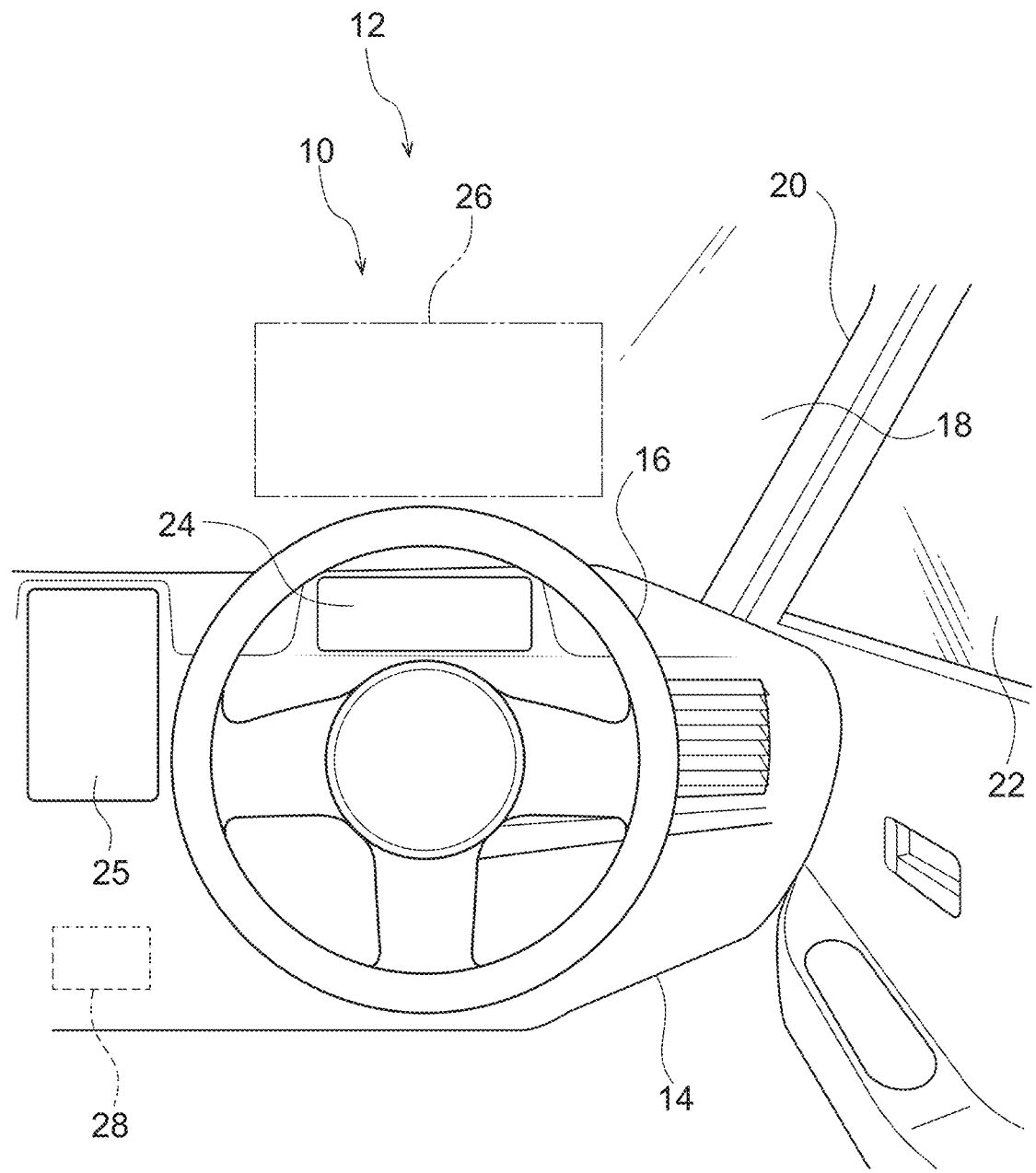
FIG. 1 is a schematic view illustrating a front section inside a vehicle cabin of a vehicle applied with a vehicle display device according to an exemplary embodiment, as viewed from a vehicle rear side.

Explanation follows regarding a vehicle 12 applied with a vehicle display device 10 according to an exemplary embodiment, with reference to the drawings. Note that the vehicle 12 of the present exemplary embodiment is as an example configured so as to be capable of switching between autonomous driving and manual driving. Note that autonomous driving is a form of vehicle travel in which operation of some or all out of an accelerator pedal, brakes, indicators, steering, and so on is autonomous. Manual driving is a form of vehicle travel in which a driver executes all the driving operations (operation of the accelerator pedal, brakes, indicators, steering, and so on). As illustrated in FIG. 1, an instrument panel 14 is provided at a front section inside a vehicle cabin of the vehicle 12.

The instrument panel 14 extends along a vehicle width direction. A steering wheel 16 is provided on a vehicle right side of the instrument panel 14. Namely, in the present exemplary embodiment as an example, the vehicle is a right-hand drive vehicle in which the steering wheel 16 is provided on the right side and a driving seat is set on the vehicle right side.

Windshield glass 18 is provided at a front end portion of the instrument panel 14. The windshield glass 18 is disposed at a vehicle front side of the driving seat, and extends along a vehicle vertical direction and the vehicle width direction so as to partition between the vehicle cabin interior and the vehicle cabin exterior.

A vehicle right end portion of the windshield glass 18 is fixed to a front pillar 20 on the vehicle right side. The front pillar 20 extends along the vehicle vertical direction, and the windshield glass 18 is fixed to a vehicle width direction inner end portion of the front pillar 20. A front end portion of front side glass 22 is fixed to a vehicle width direction outer end portion of the front pillar 20. Note that a vehicle left end portion of the windshield glass 18 is fixed to a non-illustrated front pillar on a vehicle left side.

A first display section 24 including a display region for a predetermined image is provided to the instrument panel 14. The first display section 24 is configured by a meter display provided at a vehicle width direction right-side portion of the instrument panel 14 so as to be located at the vehicle front side of the driving seat. The meter display configures part of a non-illustrated meter display device connected to various meter equipment installed to the vehicle 12. The first display section 24 is provided at a position that falls within the field of view of the driver in a state in which the driver is directing their gaze toward the vehicle front.

A second display section 25 including a display region for a predetermined image is provided to the instrument panel 14. The second display section 25 is configured by a display provided at a vehicle width direction central portion of the instrument panel 14 so as to be located at the vehicle front side of the driving seat.

A third display section 26 including a display region for a predetermined image is provided to the windshield glass 18. The third display section 26 is set at a vehicle upper side of the first display section 24, and is configured by a projection surface projected onto by a head-up display device 44 (see FIG. 2). Specifically, the head-up display device 44 is provided further toward the vehicle front side than the instrument panel 14, and a picture from the head-up display device 44 is projected onto the third display section 26 of the windshield glass 18. Namely, the third display section 26 is configured by the windshield glass 18 serving as the projection surface of the head-up display device 44.

Hardware Configuration of Vehicle Display Device 10

Figure 2:
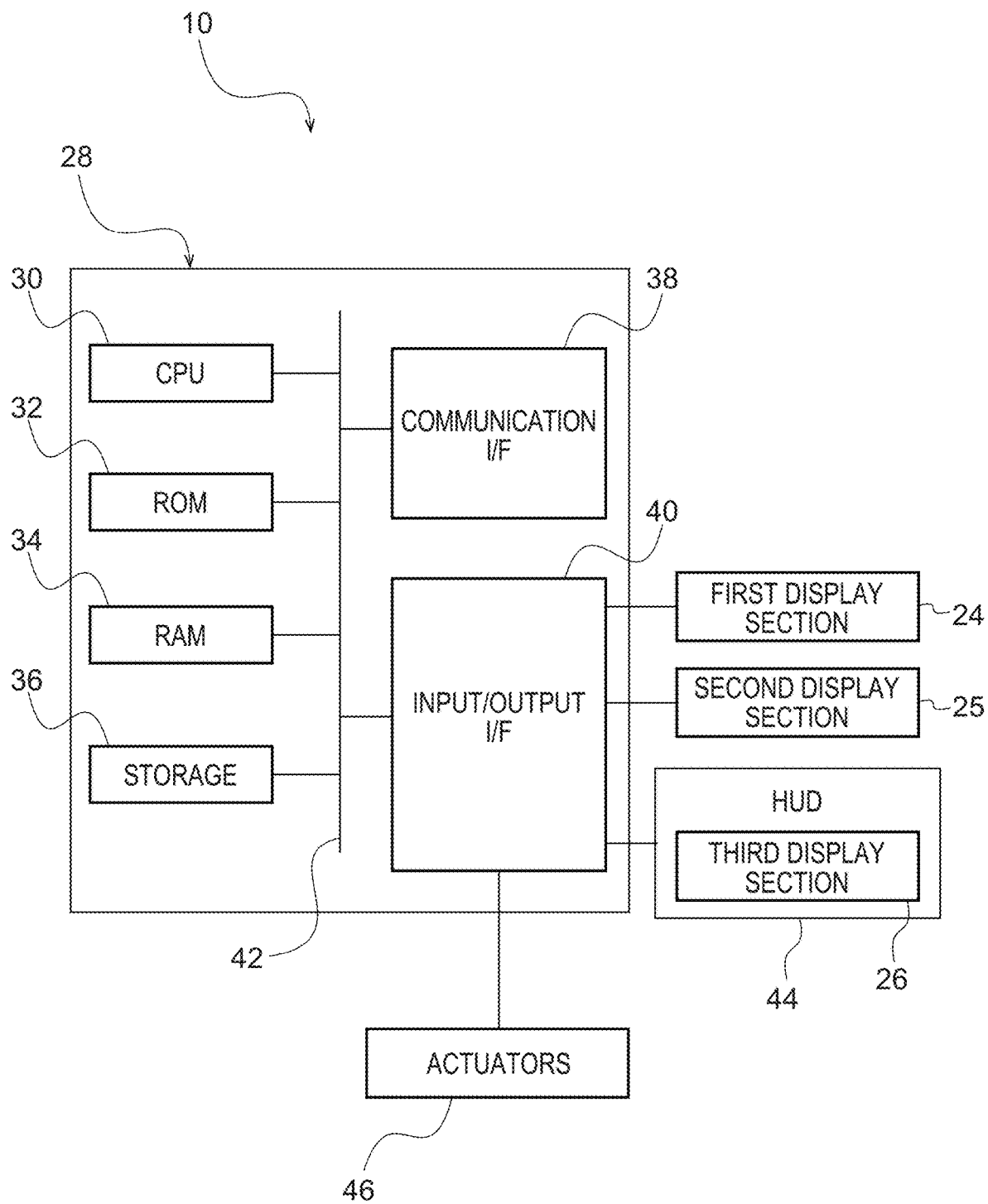
FIG. 2 is a block diagram illustrating a hardware configuration of a vehicle display device according to an exemplary embodiment.

An electronic control unit (ECU) 28, serving as a control section, is provided to the vehicle 12. FIG. 2 is a block diagram illustrating a hardware configuration of the vehicle display device 10. As illustrated in FIG. 2, the ECU 28 of the vehicle display device 10 is configured including a central processing unit (CPU: processor) 30, read only memory (ROM) 32, random access memory (RAM) 34, storage 36, a communication interface 38, and an input/output interface 40. The respective configuration is connected so as to be capable of communicating with each other through a bus 42. The CPU 30 is an example of a processor, and the RAM 34 is an example of memory.

The CPU 30 is a central processing unit that executes various programs and controls various sections. Namely, the CPU 30 reads a program from the ROM 32 or the storage 36, and executes the program using the RAM 34 as a workspace. The CPU 30 controls the respective configuration and performs various computation processing based on the program recorded in the ROM 32 or the storage 36.

The ROM 32 holds various programs and various data. The RAM 34 acts as a workspace to temporarily store programs and data. The storage 36 is configured by a hard disk drive (HDD) or a solid state drive (SSD), and holds various programs including an operating system, as well as various data. In the present exemplary embodiment, a program, various data, and the like for performing display processing are held in the ROM 32 or the storage 36.

The communication interface 38 is an interface enabling the vehicle display device 10 to communicate with a non-illustrated server and other equipment, and employs a protocol such as Ethernet (registered trademark), LTE, FDDI, or Wi-Fi (registered trademark).

The first display section 24, the second display section 25, the head-up display device 44 that projects a predetermined image onto the third display section 26, and actuators 46 are connected to the input/output interface 40. The actuators 46 are configured including a steering actuator, an accelerator actuator, and a brake actuator. The steering actuator performs steering of the vehicle 12. The accelerator actuator performs acceleration of the vehicle 12. The brake actuator controls the brakes to perform deceleration of the vehicle 12. Note that a non-illustrated camera for imaging the surroundings of the vehicle 12, as well as various sensors, a GPS device, and the like employed during autonomous travel of the vehicle 12, are also connected to the input/output interface 40.

Functional Configuration of Vehicle Display Device 10

The vehicle display device 10 implements various functions using the above-described hardware resources. Explanation follows regarding functional configuration implemented by the vehicle display device 10, with reference to FIG. 3.

Figure 3:
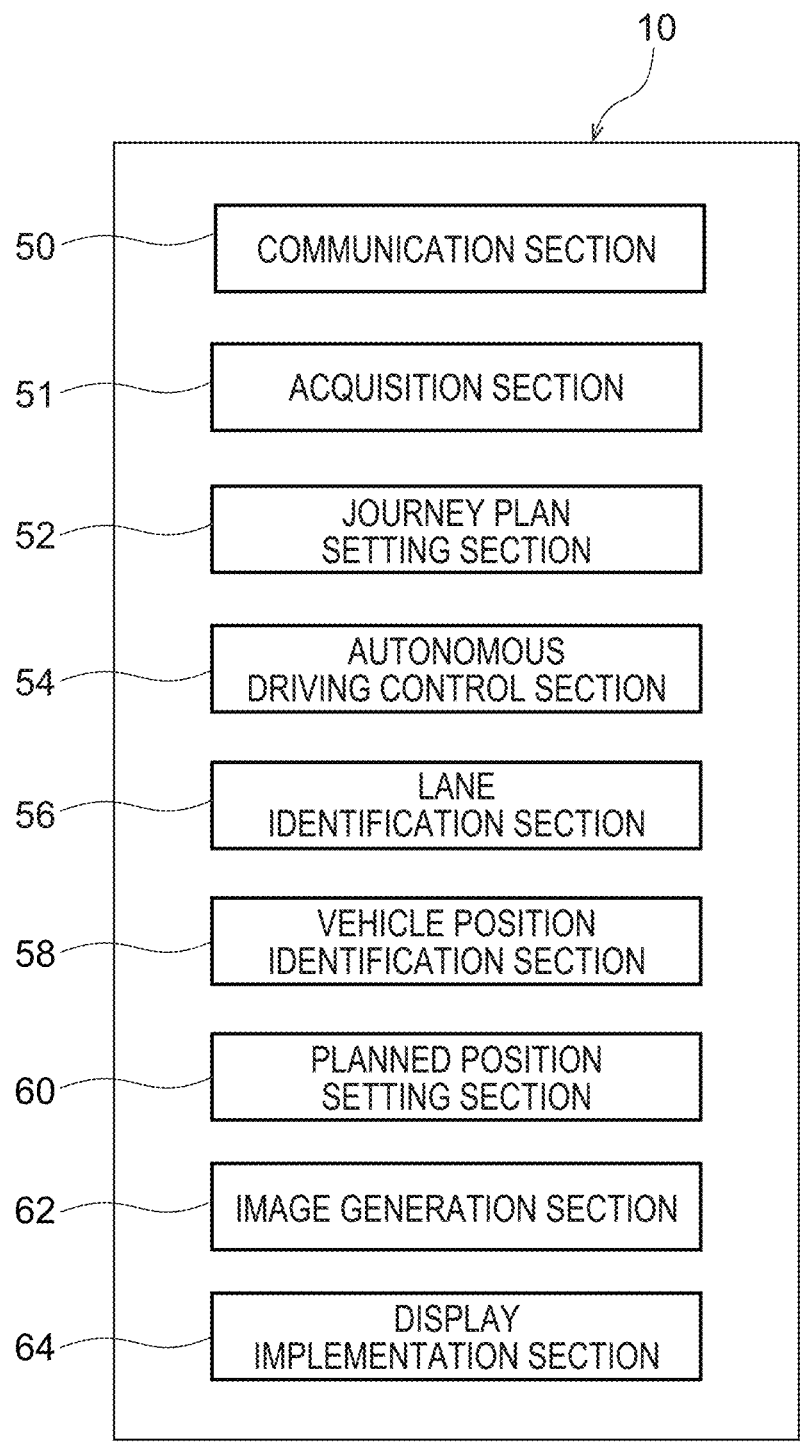
FIG. 3 is a block diagram illustrating a functional configuration of a vehicle display device according to an exemplary embodiment.

As illustrated in FIG. 3, the vehicle display device 10 is configured including a communication section 50, an acquisition section 51, a journey plan setting section 52, an autonomous driving control section 54, a lane identification section 56, a vehicle position identification section 58, a planned position setting section 60, an image generation section 62, and a display implementation section 64 as functional configuration. The respective functional configuration is implemented by the CPU 30 reading and executing the corresponding program stored in the ROM 32 or the storage 36.

The communication section 50 exchanges data with an external server and other equipment through the communication interface 38. Examples of the data exchanged include map data and traffic conditions that are held on the server. The communication section 50 may be configured to perform vehicle-to-vehicle communication with vehicles in the surrounding area.

The acquisition section 51 acquires as surroundings information a travel environment of the vehicle 12 from a non-illustrated external sensor through the input/output interface 40. The external sensor is configured including at least one out of a camera that images a predetermined range in the surroundings of the vehicle 12, millimeter-wave radar that transmits waves to search over a predetermined range, or light detection and ranging/laser imaging detection and ranging (LIDAR) that scans over a predetermined range. As an example, the "surroundings information" includes the road width of the travel lane of the vehicle 12, other vehicles traveling in the vicinity of the vehicle 12, obstacles, and so on.

The journey plan setting section 52 sets a journey plan for the vehicle 12. Specifically, when an occupant inputs a destination, a journey plan is set from the current location to the destination.

The autonomous driving control section 54 controls switching between manual driving and autonomous driving of the vehicle 12. Moreover, in cases in which a driving mode of the vehicle 12 has been switched to autonomous driving, the autonomous driving control section 54 causes the vehicle 12 to drive autonomously according to the set journey plan while taking position information and environmental information regarding the surrounding area of the vehicle 12 into consideration. Specifically, the vehicle 12 is made to travel autonomously by controlling the actuators 46.

The lane identification section 56 includes a function to identify traffic lanes ahead of the vehicle 12. Specifically, the lane identification section 56 identifies white lines L (see FIG. 5A) painted onto the road surface based on an image captured by a camera that images ahead of the vehicle 12, and identifies the traffic lanes extending ahead of the vehicle 12 based on the shape of the white lines L. Note that the lane identification section 56 may identify the traffic lanes extending ahead of the vehicle 12 based on position information for the vehicle 12 acquired by the GPS device and on high precision map information.

In cases in which the vehicle 12 is to change lanes according to the journey plan, the vehicle position identification section 58 identifies a relative positional relationship of the vehicle 12 with respect to the travel lane of the vehicle 12 and to a lane that is the lane change destination. Specifically, the position of the vehicle 12 is estimated based on at least one out of an image captured by the camera that images ahead of the vehicle 12, a lateral direction movement amount computed based on a yaw angle of the vehicle 12, or a duration that has elapsed since the lane change start time.

Note that the vehicle position identification section 58 may identify the position of the vehicle 12 with respect to its travel lane and to the lane that is the lane change destination based on vehicle position information acquired by the GPS device and on high precision map information.

Prior to the lane change being performed by the vehicle 12 according to the journey plan, the planned position setting section 60 includes a function to set a planned position of the vehicle 12 that is planned to be the lane change destination. Specifically, the planned position setting section 60 determines where there is a travel space for the vehicle 12 on the lane that is the lane change destination based on the surroundings information for the vehicle 12 acquired by the acquisition section 51, and sets this travel space as a planned position P (see FIG. 5A) at the lane change destination in cases in which a determination is made that there are no obstacles ahead of or behind the vehicle 12.

The image generation section 62 generates an image for display on the third display section 26. Images generated by the image generation section 62 include for example a meter display M (see FIG. 6) indicating a travel speed of the vehicle 12, and various images to support manual driving or autonomous driving.

Figure 6:
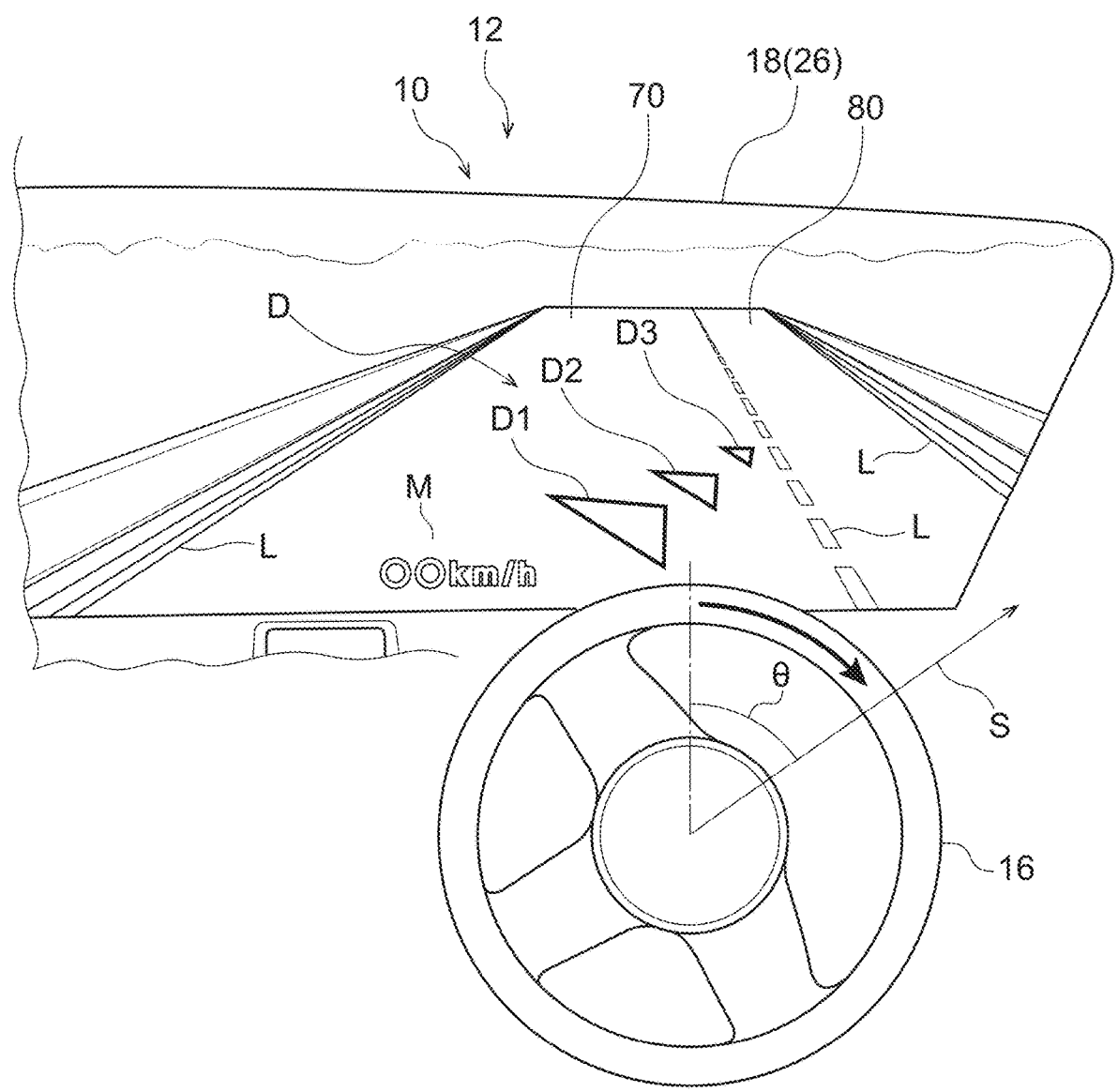
FIG. 6 is a diagram illustrating an example of a display method of a direction image at a start of a lane change.

In the present exemplary embodiment, when the vehicle 12 is to change lanes in particular, the image generation section 62 generates a direction image D (see FIG. 6) indicating a direction of progress of the vehicle 12 during progress from the start to the end of the lane change. As illustrated in FIG. 6, as an example, the direction image D includes three arrow-shaped images D1 to D3. The images D1 to D3 are arranged in a row from a near side toward a far side of the display region of the third display section 26 (from the lower side toward the upper side of the windshield glass 18), and are configured so as to chronologically indicate the direction of progress of the vehicle in a sequence from the image D1 at the near side of the display region. Thus, the images D1 to D3 that are arranged in a row indicate an planned travel route of the vehicle 12 within a predetermined duration.

For example, in cases in which the three arrow-shaped images D1 to D3 indicate the planned travel route of the vehicle 12 within a predetermined duration from the current time, the image D1 displayed at the foremost side of the display region indicates the direction of progress of the vehicle 12 at the current time. Note that the "direction of progress" of the vehicle 12 may be the direction in which the vehicle 12 is actually proceeding, or may be a recommended direction of progress based on the set journey plan.

Note that the direction indicated by the direction image D (images D1 to D3) is a direction corresponding to a rotation angle θ (see FIG. 6) of the steering wheel 16 in an envisaged case in which the vehicle 12 is made to travel along the planned travel route. This enables the direction of progress of the vehicle to be indicated more emphatically than if a direction corresponding to an actual steering angle (tire turning angle) when the vehicle 12 travels along the planned travel route were employed. Moreover, by displaying the direction image D so as to match the gaze of an occupant in the driving seat, the direction indicated by the direction image D is coordinated with rotation of the steering wheel 16. This enables the occupant to intuitively ascertain the operation of the steering wheel during the lane change.

The display implementation section 64 includes a function to display the picture generated by the image generation section 62 on the display region of the third display section 26, and a function to delete the picture displayed on the third display section 26.

For example, the display implementation section 64 displays various images including the direction image D on the display region of the third display section 26 such that these images are a fusion with the scene ahead of the vehicle 12 as seen by the driving seat occupant through the third display section 26 (windshield glass 18). For example, as illustrated in FIG. 6 and so on, the meter display M is displayed on the display region of the third display section 26 at a position at a lower part of the field of view of the driving seat occupant in consideration of securing visibility at the vehicle front side.

In the present exemplary embodiment, in particular, the display implementation section 64 displays the direction image D at a position superimposed on the traffic lanes extending ahead of the vehicle 12 as seen through the third display section 26 (windshield glass 18). Thus, the driving seat occupant is able to identify the direction of progress of the vehicle 12 without greatly shifting their gaze from the scene ahead.

Operation

Next, explanation follows regarding operation of the present exemplary embodiment.

Display Processing

Figure 4:
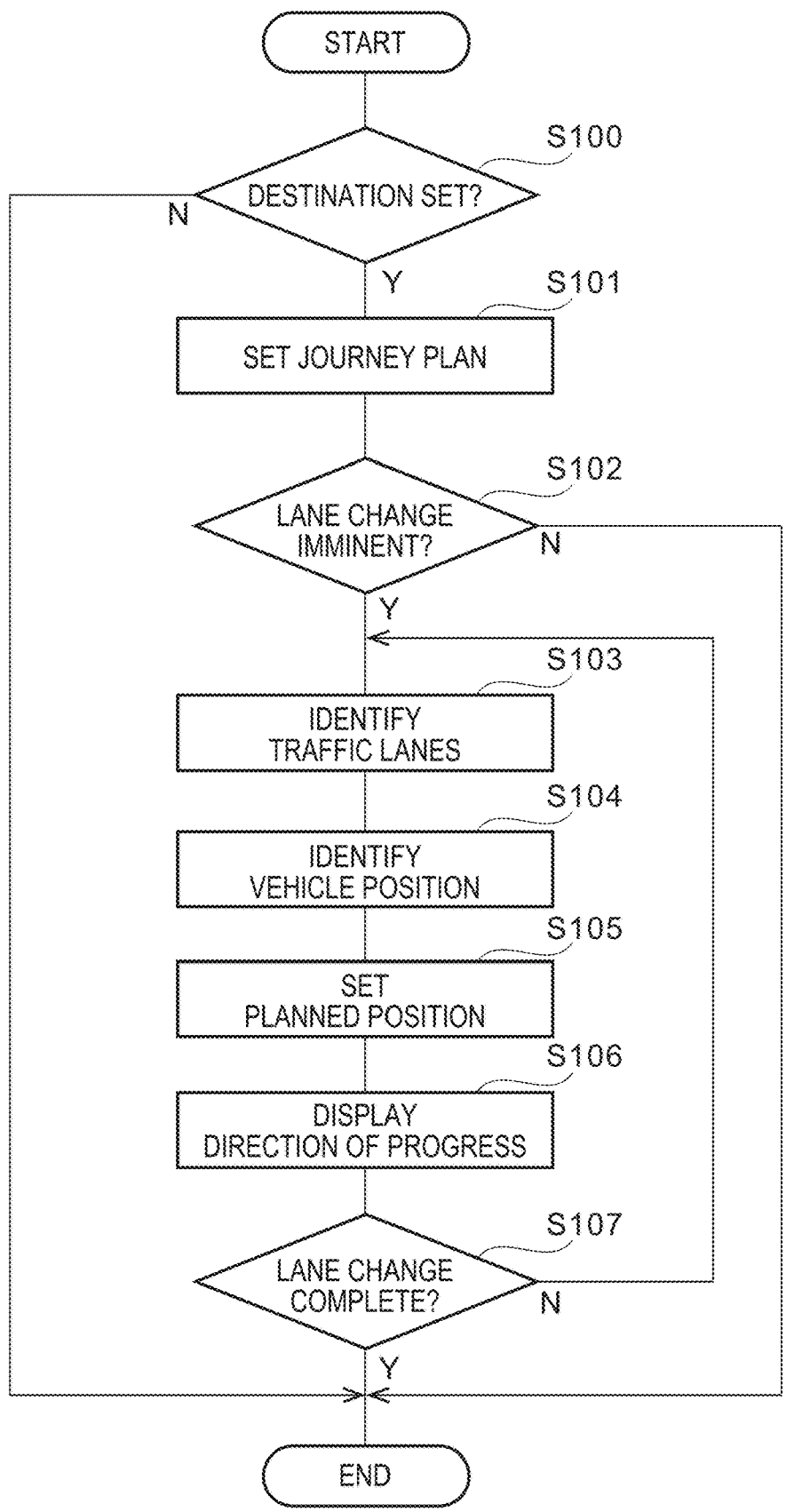
FIG. 4 is a flowchart illustrating an example of a flow of display processing of an exemplary embodiment.

Explanation follows regarding an example of the display processing to display the direction image D on the third display section 26 when the vehicle 12 is to change lanes, with reference to the flowchart illustrated in FIG. 4. This display processing is executed by the CPU 30 reading a display program from the ROM 32 or the storage 36 and expanding and executing the display program in the RAM 34.

In the present exemplary embodiment, the display processing is executed in cases in which a lane change is planned during autonomous driving of the vehicle 12. As illustrated in FIG. 4, at step S100, the CPU 30 determines whether or not a destination has been set. An occupant may input the destination directly to the vehicle 12, or may input the destination indirectly using a mobile terminal or the like.

In cases in which the CPU 30 determines that the destination has been set at step S100, processing transitions to step S101. In cases in which the CPU 30 determines that the destination has not been set at step S100, the display processing is ended.

At step S101, the CPU 30 sets a journey plan for the vehicle 12. Specifically, the CPU 30 uses the functionality of the journey plan setting section 52 to set a journey plan from the current location to the destination. Information relating to traffic conditions, accidents, and the like may be acquired and reflected when setting the journey plan. Moreover, the journey plan may be set so as to include a large degree of autonomous driving according to occupant preferences input in advance.

At step S102, the CPU 30 determines whether or not a lane change is imminent based on the journey plan set at step S102. Determination that a lane change is imminent is for example made in cases in which the vehicle 12 has passed a target point where the lane change starts. Alternatively, determination that a lane change is imminent may be made in cases in which a determination is made that the vehicle 12 has come within a predetermined duration of a target point where the lane change starts, based on the speed of the vehicle 12. Alternatively, determination that a lane change is imminent may be made in cases in which the occupant has activated an indicator light while traveling in an area where the lane change is possible based on the journey plan.

In cases in the CPU 30 determines that a lane change is imminent at step S102, processing transitions to step S103. In cases in which the CPU 30 determines that a lane change is not imminent at step S102, the display processing is ended.

Figure 5A:
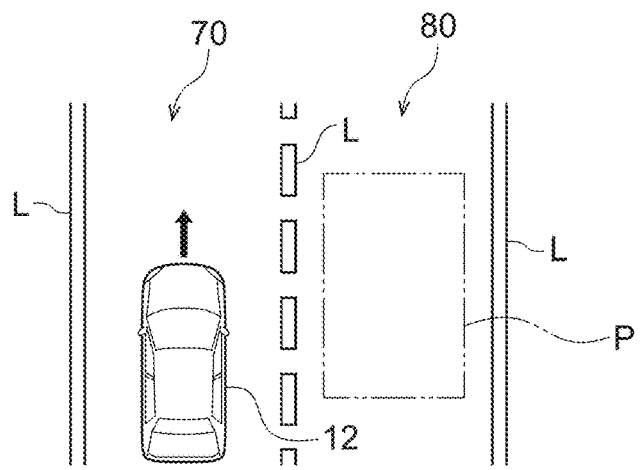
FIG. 5A is a schematic plan view illustrating progress of a vehicle lane change at a start of the lane change.
Figure 5B:
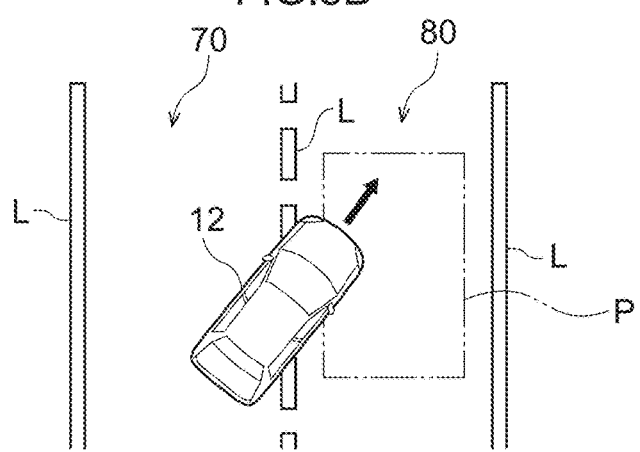
FIG. 5B is a schematic plan view illustrating progress of a vehicle lane change during the lane change.
Figure 5C:
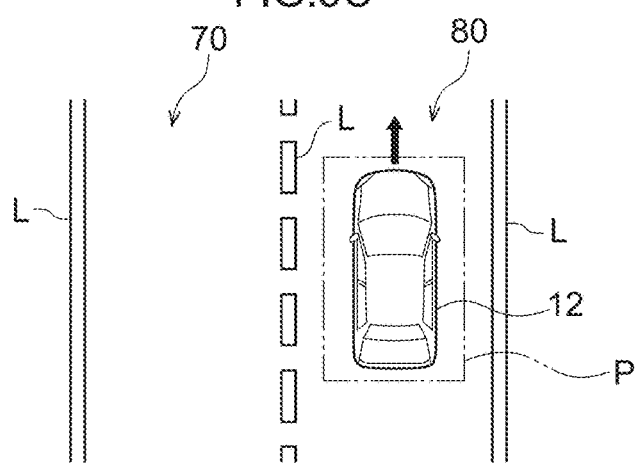
FIG. 5C is a schematic plan view illustrating progress of a vehicle lane change at an end of the lane change.

At step S103, the CPU 30 uses the functionality of the lane identification section 56 to identify traffic lanes ahead of the vehicle 12. For example, as illustrated in FIG. 5A to FIG. 5C, in cases in which the vehicle 12 is traveling on a two-lane road, a left-hand lane 70 on which the vehicle 12 is traveling and a right-hand lane 80 adjacent to the left-hand lane 70 are identified.

At step S104, the CPU 30 uses the functionality of the vehicle position identification section 58 to identify the position of the vehicle 12 with respect to the identified lanes.

At step S105, the CPU 30 uses the functionality of the planned position setting section 60 to set a planned position at the lane change destination. For example, as illustrated in FIG. 5A to FIG. 5C, in cases in which the vehicle 12 is changing travel lanes from the left-hand lane 70 to the adjacent right-hand lane 80, a predetermined space on the right-hand lane 80 is set as the planned position P. Once the planned position P has been set, the CPU 30 uses the functionality of the autonomous driving control section 54 to start the lane change of the vehicle 12 by autonomous driving.

At step S106, the CPU 30 displays the direction image D on the display region of the third display section 26. Specifically, in cases in which the driving seat occupant is viewing ahead of the vehicle, the CPU 30 displays the direction image superimposed on the lanes 70, 80 ahead of the vehicle 12 as seen through the third display section 26 (windshield glass 18). When this is performed, the CPU 30 acquires the rotation angle θ of the steering wheel 16 based on a control signal from the steering actuator, and generates and displays the direction image D so as to indicate a direction corresponding to the rotation angle θ.

The CPU 30 continually alters the direction indicated by the direction image D in response to changes in the relative positional relationship of the vehicle 12 with respect to the planned position P. Thus, when the vehicle 12 is proceeding toward the planned position P, the direction indicated by the direction image D is chronologically altered in coordination with rotation of the steering wheel 16.

Figure 7:
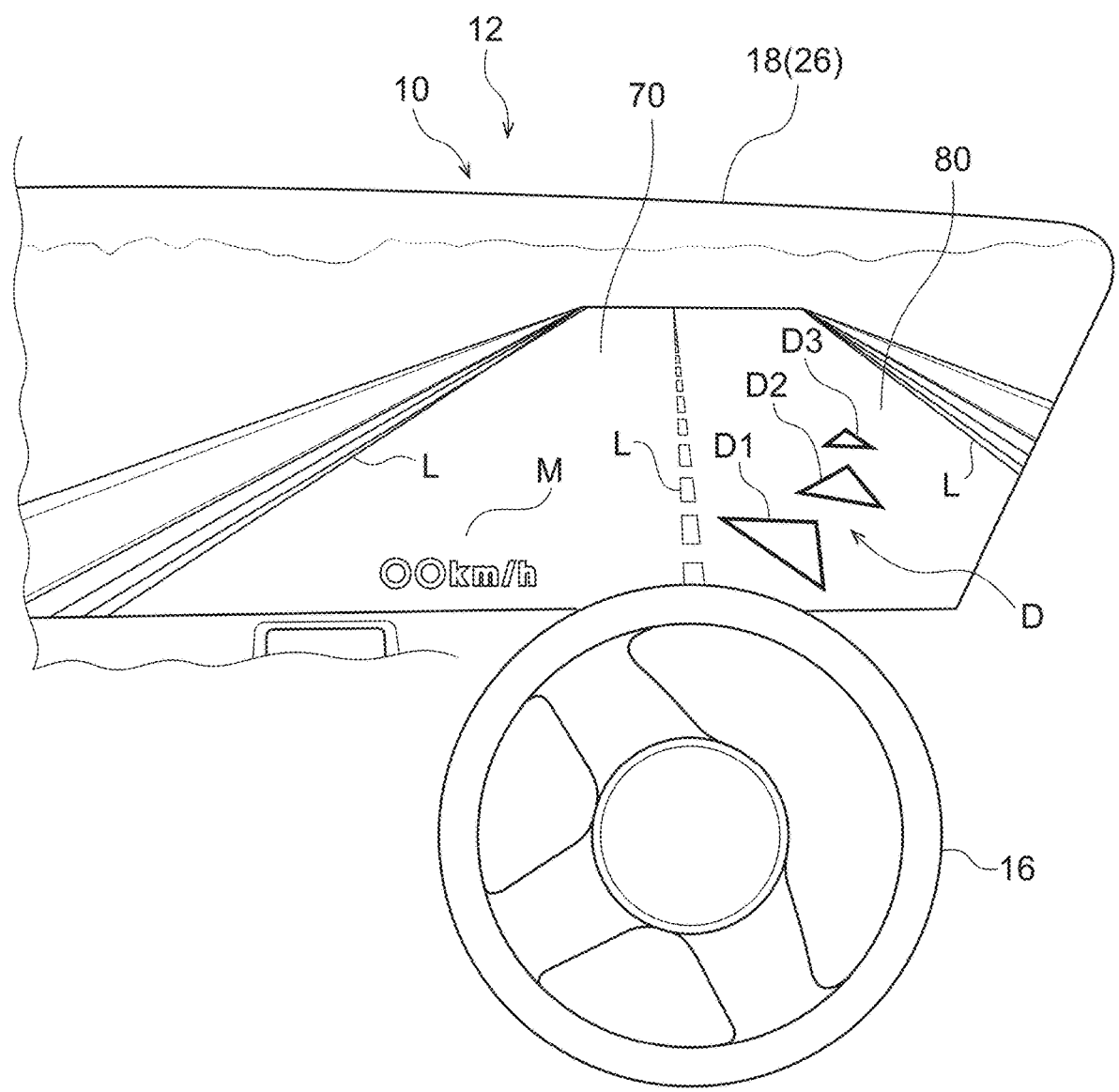
FIG. 7 is a diagram illustrating an example of a display method of a direction image during a lane change.
Figure 8:
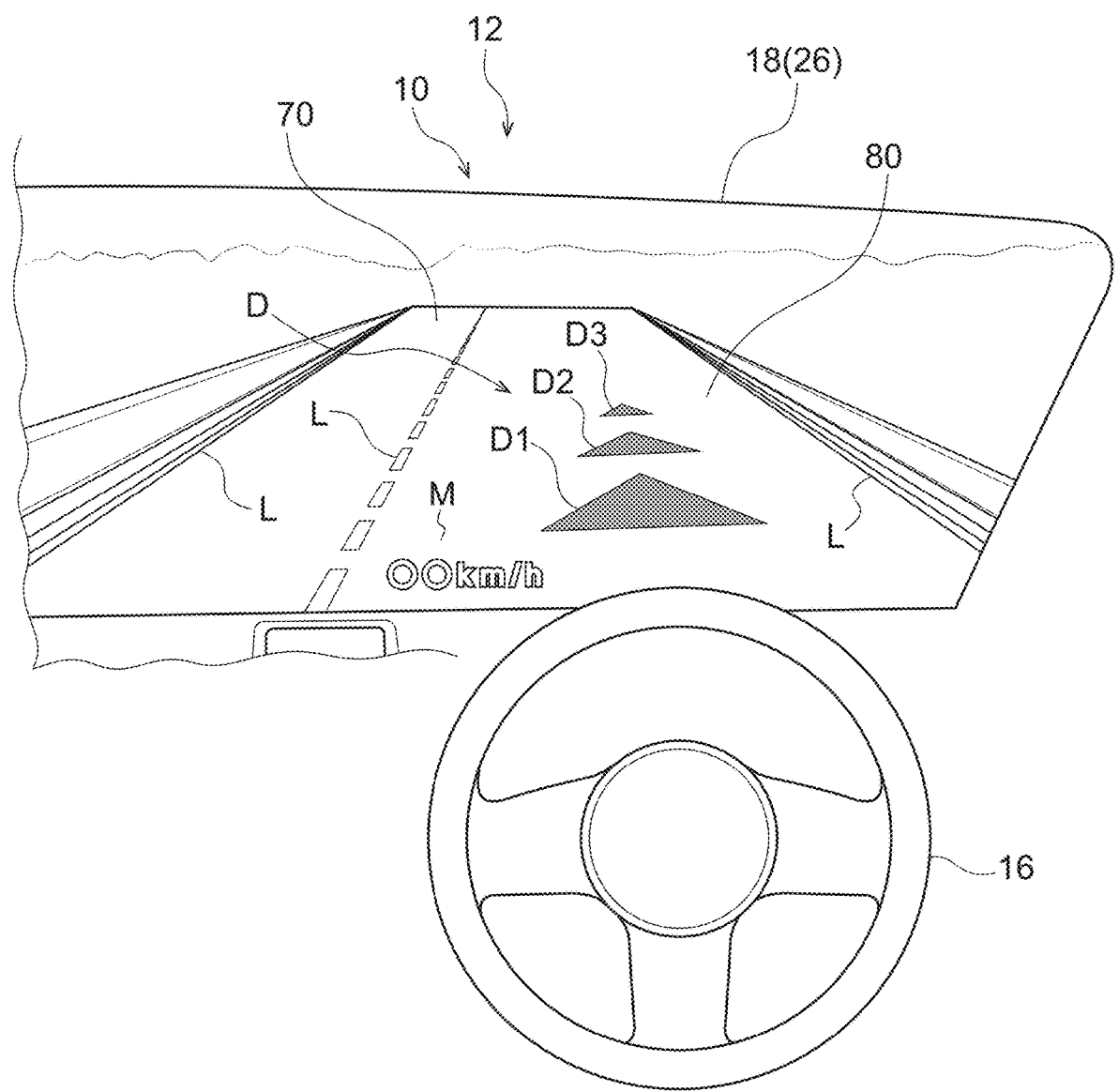
FIG. 8 is a diagram illustrating an example of a display method of a direction image at an end of a lane change.

Explanation follows regarding an example of the direction image D displayed in the process of the vehicle 12 changing lanes from the left-hand lane 70 to the right-hand lane 80 as illustrated in FIG. 5A to FIG. 5C, with reference to FIG. 6 to FIG. 8. Note that as an example, FIG. 6 to FIG. 8 illustrate forms of display on the third display section 26 as seen by the driving seat occupant.

FIG. 6 illustrates a display format of the direction image D at the start of the lane change. As illustrated in FIG. 6, the three arrow-shaped images D1 to D3 run along a direction S corresponding to the rotation angle θ of the steering wheel 16 so as to indicate the right-hand lane 80 that is the lane change destination, and are displayed in white. The images D1 to D3 are arranged in a straight line on progression toward the oblique front-right of the vehicle 12. Thus, on viewing the direction image D, the occupant is able to perceive that the lane change has started, and to understand that the vehicle 12 is advancing straight toward the oblique front-right.

FIG. 7 illustrates a display format of the direction image D during the lane change. The images D1 to D3 are arranged in a curved shape that curves on progression from the left-hand lane 70 side toward the right-hand lane 80 side, and are displayed in white. Thus, on viewing the direction image D, the occupant is able to perceive that the lane change is in progress, and to understand that, after having advanced straight toward the oblique front-right and moved into the right-hand lane 80, the vehicle 12 is planned to proceed directly along the right-hand lane 80.

FIG. 8 illustrates a display format of the direction image D at the end of the lane change. The images D1 to D3 are arranged in a straight line on progression along the right-hand lane 80. Thus, on viewing the direction image D, the occupant is able to perceive that the lane change has ended, and to understand that the vehicle 12 is advancing straight ahead along the right-hand lane 80 that is the lane change destination. When this is performed, the display color of the images D1 to D3 is changed from white to blue so as to emphasize the display. This enables the occupant to perceive from the color of the direction image D also that the lane change has ended.

At step S107, the CPU 30 determines whether or not the lane change of the vehicle 12 is complete. This determination as to whether or not the lane change is complete is made by for example determining whether or not the vehicle 12 is traveling on the lane that is the lane change destination (the right-hand lane 80 in FIG. 8) based on the functionality of the vehicle position identification section 58. Alternatively, the lane change may be determined to be complete in cases in which the indicator light has been switched off by the occupant.

In cases in which the CPU 30 determines that the lane change is complete at step S107, the display processing is ended. In cases in which a determination is made that the lane change is not complete, processing returns to step S103 and the processing of step S103 onward is repeated.

As described above, the vehicle display device 10 according to the present exemplary embodiment displays a predetermined image on the display region of the third display section 26 that depicts the scene ahead of the vehicle 12. The vehicle display device 10 identifies the lanes 70, 80 ahead of the vehicle 12 and the position of the vehicle 12 with respect to these lanes, and sets the planned position P planned to be the lane change destination based on the position of the vehicle 12. Then, when the vehicle 12 is to change lanes, the direction image D indicating the direction of progress of the vehicle 12 is displayed on the display region. Note that the vehicle display device 10 alters the direction indicated by the direction image D based on the relative positional relationship of the vehicle 12 with respect to the planned position P. Chronologically altering the direction indicated by the direction image D in this manner enables the occupant to perceive the process in which the vehicle 12 is proceeding toward the planned position P, thereby enabling the progress of the lane change to be conveyed in stages to the occupant.

Moreover, in the display processing of the present exemplary embodiment, in cases in which the lane change is performed during autonomous driving, the occupant is able to perceive the process by which the vehicle 12 is proceeding toward the planned position P from the chronological alterations to the direction indicated by the direction image D. The occupant is thereby able to ascertain that the vehicle 12 is being controlled during the lane change by autonomous driving, thereby enabling any anxiety felt by the occupant to be alleviated.

Moreover, in the present exemplary embodiment, the directions indicated by the direction image D are altered between at the start of the lane change, during the lane change, and at the end of the lane change, such that the occupant is able to perceive the progress from the start to the end of the lane change from the direction indicated by the direction image D.

Furthermore, in the present exemplary embodiment, the direction indicated by the direction image is continually altered, enabling a visual effect to be imparted to the occupant whereby the direction indicated by the direction image D is altered in coordination with movement of the vehicle 12 toward the planned position. This enables the occupant to intuitively perceive the progress of the lane change.

Moreover, in the present exemplary embodiment, the color of the direction image D is altered at the timing when the lane change ends. Specifically, the color of the direction image D is altered from white to blue at the end of the lane change. This enables the fact that that the lane change has safely ended to be emphatically conveyed to the occupant using the display colors of the direction images, thereby enabling the occupant to feel more secure.

Note that although the color of the direction image D is altered at the timing when the lane change ends in the present exemplary embodiment, the color of the direction image D may also be altered at timings when the lane change starts and during the lane change.

Moreover, in the present exemplary embodiment, the direction indicated by the direction image D is emphatically displayed based on a direction corresponding to the rotation angle θ of the steering wheel 16 that is larger than the actual steering angle of the vehicle 12. This enables the direction of progress of the vehicle 12 to be emphatically displayed to the occupant. Moreover, the direction indicated by the direction image D is indicated in coordination with rotation of the steering wheel 16. This enables the occupant to intuitively ascertain that the steering wheel 16 is being operated during the lane change, and to perceive the progress of the lane change.

Moreover, in the present exemplary embodiment, the direction image D includes the plural images D1 to D3 that are arranged in a row from the near side to the far side of the display region. These plural images D1 to D3 chronologically indicate the direction of progress of the vehicle 12 in a sequence from the image D1 at the near side of the display region. Thus, the planned travel route of the vehicle 12 is indicated by the direction image D, and the planned travel route is chronologically altered by altering the direction indicated by the direction image D. Viewing the manner of these chronological alterations to the planned travel route of the vehicle 12 enables the occupant to perceive the progress of the lane change.

Moreover, in the present exemplary embodiment, the display region of the third display section 26 that depicts the scene ahead of the vehicle is configured by the projection surface of the head-up display device 44 provided at the vehicle front side of the driving seat. The direction image D is displayed so as to be superimposed on the lanes 70, 80 that are visible through the display region. Thus, in the vehicle display device 10, the direction image D is displayed as a fusion with the scene ahead as viewed from the driving seat of the vehicle, thereby enabling the driving seat occupant to perceive the lane change in stages without having to shift their gaze from the scene ahead.

Additional Explanation

Figure 9:
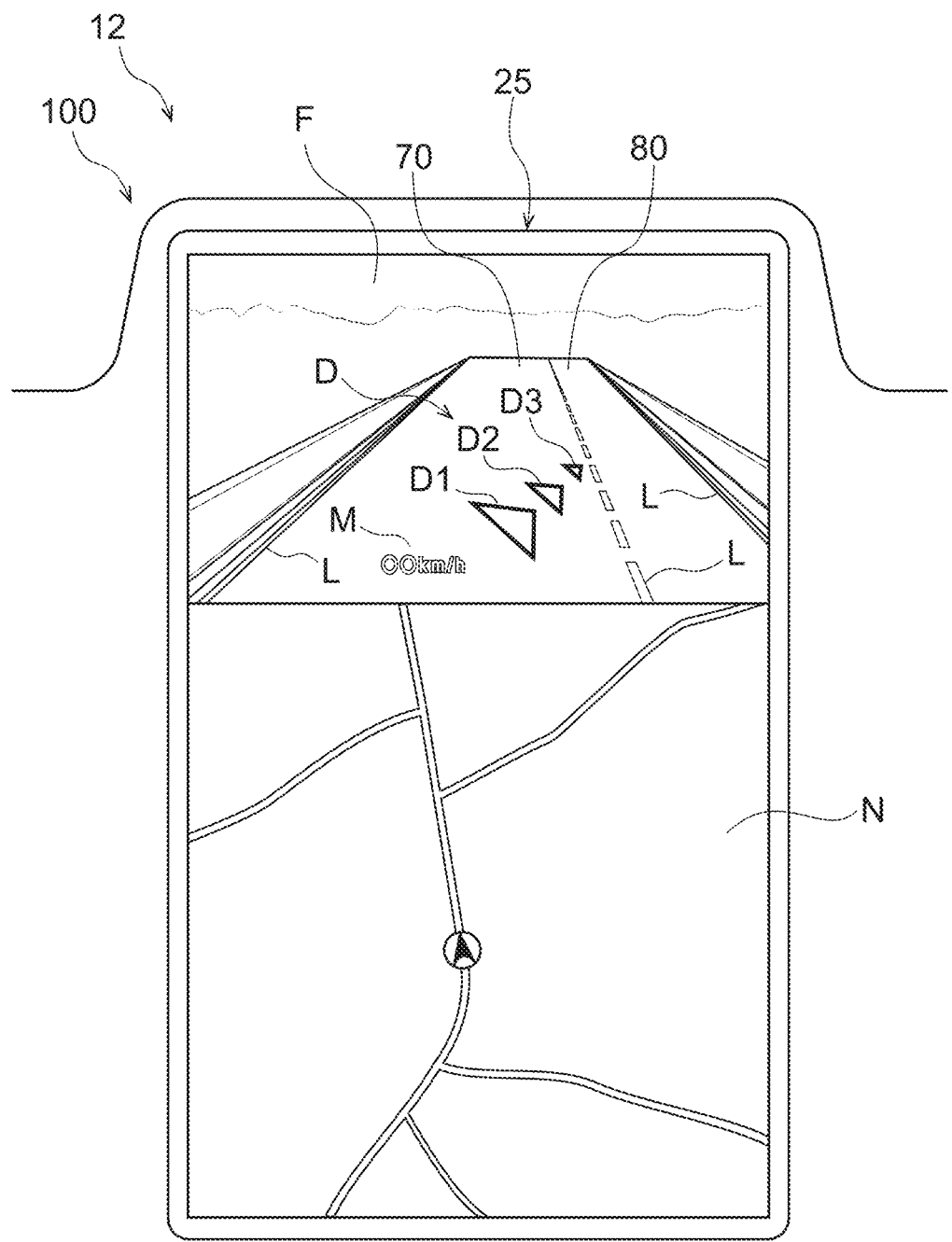
FIG. 9 is a schematic diagram illustrating a vehicle display device according to a modified example of an exemplary embodiment.

Although a case in which the display region depicting the scene ahead of the vehicle is configured by the projection surface of the head-up display device 44 has been described in the above exemplary embodiment, the present disclosure is not limited thereto. As illustrated by a vehicle display device 100 according to a modified example in FIG. 9, the direction image D may be displayed on the display region of the second display section 25 configured by the display provided to the instrument panel 14. In the second display section 25 in FIG. 9, a map image N depicting the current position of the vehicle 12 is displayed on a lower part of the display region, and a frontal image F depicting the scene ahead of the vehicle is displayed on an upper part of the display region. The frontal image F is for example configured by an image or an animated frontal image acquired from a non-illustrated camera that images ahead of the vehicle 12. The direction image D is displayed so as to be superimposed on the lanes 70, 80 ahead of the vehicle 12 included in the frontal image F. This enables an occupant viewing the second display section 25 to perceive the progress of the lane change of the vehicle 12 in stages, regardless of their seating position.

Similarly, the direction image D may be displayed on the display region of the first display section 24 configured by the meter display provided to the instrument panel 14 at the vehicle front side of the driving seat. Since the first display section 24 is provided at the vehicle front side of the driving seat, the driving seat occupant is able to perceive the progress of the lane change of the vehicle 12 in stages without greatly shifting their gaze from the scene ahead of the vehicle.

Moreover, although a case in which the direction image D is configured by the three arrow-shaped images D1 to D3 has been described in the above exemplary embodiment, there is no limitation thereto. The direction image may be displayed in various formats. For example, the direction image may be configured by a single arrow-shaped image, or the direction image may be configured by four or more arrow-shaped images.

Although the direction image D is displayed during a lane change by autonomous driving of the vehicle in the display processing of the above exemplary embodiment, there is no limitation thereto. Configuration may be such that the direction image D is displayed during a lane change by manual driving.

Although a direction corresponding to the rotation angle θ of the steering wheel 16 is set as the direction indicated by the direction image D in the above exemplary embodiment, there is no limitation thereto. As long as the direction indicated by the direction image D is set as a direction corresponding to a steering angle that is greater than the actual steering angle (tire turning angle) of the vehicle, the direction of progress of the vehicle can be emphatically displayed.

Note that the display processing executed by the CPU reading and executing software (a program) in the above exemplary embodiment may be executed by various types of processor other than the CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although a format has been described in which the display processing program is pre-stored (installed) in the ROM or the storage in the above exemplary embodiment, there is no limitation thereto. The program may be provided in a format recorded onto a recording medium such as compact disc read only memory (CD-ROM), digital versatile disc read only memory (DVD-ROM), or universal serial bus (USB) memory. Alternatively, the program may be provided in format downloadable from an external device over a network.

What is claimed is:

1. A display method for displaying a predetermined image at a display region depicting a scene ahead of a vehicle, in which a computer executes processing comprising:
    identifying a traffic lane ahead of the vehicle;
    identifying a current position of the vehicle with respect to the traffic lane;
    establishing a planned position that is a planned lane change destination based on the current position of the vehicle;
    determining that a lane change is imminent; and
    when the lane change is determined to be imminent, displaying a direction image indicating a direction of progress of the vehicle at the display region, and altering a direction indicated by the direction image based on a relative positional relationship of the vehicle with respect to the planned position wherein an angle of the direction image corresponds with a rotation of a steering wheel;
    wherein:
    the direction image includes a plurality of images arranged in a row from a near side toward a far side of the display region and indicating each direction corresponding to each rotation angle of the steering wheel along a planned travel route; and
    displaying the direction image further comprises displaying the plurality of images arranged in a straight line toward a direction of the lane change destination at a time at a start of the lane change, and then, continually alter the arrangement to a curved arrangement over time in coordination with a rotation of the steering wheel.

2. A computer readable non-transitory storage medium storing a program executable by a processor to display a predetermined image at a display region depicting a scene ahead of a vehicle by executing processing comprising:
    identifying a traffic lane ahead of the vehicle;
    identifying a current position of the vehicle with respect to the traffic lane;
    establishing a planned position that is a planned lane change destination based on the current position of the vehicle; and
    when the vehicle is to change lanes, displaying a direction image indicating a direction of progress of the vehicle at the display region, and altering a direction indicated by the direction image based on a relative positional relationship of the vehicle with respect to the planned position wherein an angle of the direction image corresponds with a rotation of a steering wheel;
    wherein:
    the direction image includes a plurality of images arranged in a row from a near side toward a far side of the display region and indicating each direction corresponding to each rotation angle of the steering wheel along a planned travel route; and
    displaying the direction image further comprises displaying the plurality of images arranged in a straight line toward a direction of the lane change destination at a time at a start of the lane change, and then, continually alter the arrangement to a curved arrangement over time in coordination with a rotation of the steering wheel.

3. A vehicle display device configured to display a predetermined image at a display region depicting a scene ahead of a vehicle, the vehicle display device comprising:
    a memory; and
    a processor coupled to the memory, the processor being configured to:
    identify a traffic lane ahead of the vehicle,
    identify a current position of the vehicle with respect to the traffic lane,
    establish a planned position that is a planned lane change destination based on the current position of the vehicle, and
    when the vehicle is to change lanes, display a direction image indicating a direction of progress of the vehicle at the display region, and alter a direction indicated by the direction image based on a relative positional relationship of the vehicle with respect to the planned position wherein an angle of the direction image corresponds with a rotation angle of a steering wheel;

wherein:
the direction image includes a plurality of images arranged in a row from a near side toward a far side of the display region and indicating each direction corresponding to each rotation angle of the steering wheel along a planned travel route; and
wherein the processor is further configured to display the plurality of images arranged in a straight line toward a direction of the lane change destination at a time at a start of the lane change, and then, to continually alter the arrangement to a curved arrangement over time in coordination with a rotation of the steering wheel.

4. The vehicle display device of claim 3, wherein the processor is configured to display the direction image at the display region when the vehicle is to change lanes by autonomous driving.

5. The vehicle display device of claim 3, wherein the processor is configured to alter the direction indicated by the direction image at a time at the start of the lane change, during the lane change, and at a time at an end of the lane change.

6. The vehicle display device of claim 3, wherein the processor is configured to continually alter the direction indicated by the direction image.

7. The vehicle display device of claim 3, wherein the processor is configured to alter a color of the direction image at least one of a time at the start of the lane change, during the lane change, or a time at an end of the lane change.

8. The vehicle display device of claim 3, wherein the processor is configured to display the direction indicated by the direction image based on a direction corresponding to a rotation angle of a steering wheel that is greater than an actual steering angle of the vehicle.

9. The vehicle display device of claim 3, wherein:
the display region is configured by a projection surface that is provided at a vehicle front side of a driving seat and configured to be projected onto by a head-up display device; and
the processor is configured to display the direction image indicating the direction of progress of the vehicle at the display region so as to be superimposed on a traffic lane in the scene ahead of the vehicle as viewed through the display region.

10. The vehicle display device of claim 3, wherein the plurality of images are arranged in a straight line again at a time at an end of the lane change, and then change display color to notify a time at and end of the lane change.

11. The vehicle display device of claim 3, wherein the processor is further configured to display the plurality of images arranged in a straight line toward the direction of the lane change destination, wherein a size of an angle formed with the direction of progress of the vehicle matches a size of a rotation angle of the steering wheel at a time at the start of the lane change.

12. The vehicle display device of claim 3, wherein the processor is further configured to display the plurality of images arranged in a straight line toward the direction of the lane change destination, wherein a size of an angle formed with the direction of progress of the vehicle is larger than an actual steering angle of the vehicle at a time at the start of the lane change.

13. The vehicle display device of claim 3, wherein the processor is configured to determine the rotation angle of the steering wheel.

14. The vehicle display device of claim 3, wherein the processor is further configured to display the plurality of images arranged in a straight line toward a direction of the lane change destination at a time at a start of the lane change, then, to continually alter the arrangement to a curved arrangement over time in coordination with a rotation of the steering wheel, and then, to continually alter the arrangement to a straight lined arrangement toward the direction of progress of the vehicle over time in coordination with a rotation of the steering wheel.

15. The vehicle display device of claim 3, wherein the degree to which the arrangement of the plurality of images alters from a straight line to a curved arrangement relates to the steering wheel angle.

* * * * *